US010693564B2

(12) United States Patent
Gianvittorio et al.

(10) Patent No.: US 10,693,564 B2
(45) Date of Patent: Jun. 23, 2020

(54) PHOTONICS INTERFERENCE CANCELER

(71) Applicant: Raytheon Company, Waltham, MA (US)

(72) Inventors: John P. Gianvittorio, Severna Park, MD (US); Larry C. Martin, Allen, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/151,705

(22) Filed: Oct. 4, 2018

(65) Prior Publication Data
US 2020/0112377 A1 Apr. 9, 2020

(51) Int. Cl.
*H04B 10/70* (2013.01)
*H04B 10/69* (2013.01)
*H04B 10/516* (2013.01)

(52) U.S. Cl.
CPC .......... *H04B 10/70* (2013.01); *H04B 10/516* (2013.01); *H04B 10/697* (2013.01)

(58) Field of Classification Search
CPC .......... H04B 10/2507; H04B 10/25752; H04B 1/525; H04B 2210/006; H04L 25/03006; H04W 28/04
USPC ................................................ 398/140–172
See application file for complete search history.

(56) References Cited

U.S. PATENT DOCUMENTS

| | | |
|---|---|---|
| 5,333,000 A | 7/1994 | Hietala et al. |
| 7,202,812 B2 | 4/2007 | Krikorian et al. |
| 8,682,170 B2 | 3/2014 | Prucnal |
| 9,209,840 B2 | 12/2015 | Cox |
| 9,237,043 B1 | 1/2016 | Beals et al. |
| 9,444,502 B2 | 9/2016 | Kpodzo et al. |
| 9,479,214 B2* | 10/2016 | Webb ..................... H04B 1/525 |
| 9,553,712 B2* | 1/2017 | Webb ..................... H04B 1/525 |
| 9,571,205 B1* | 2/2017 | Suarez .................... G02F 2/002 |
| 9,712,233 B1 | 7/2017 | Deng et al. |

(Continued)

OTHER PUBLICATIONS

Matthew P. Chang, Eric C. Blow, Jingyi J. Sun, Monica Z. Lu, Paul R. Prucnal, Integrated Microwave Photonic Circuit for Self-Interference Cancellation, IEEE, vol. 65, No. 11, Nov. 2017, pp. 4493-4501, 9 pages.

(Continued)

*Primary Examiner* — Amritbir K Sandhu
(74) *Attorney, Agent, or Firm* — Daly Crowley Mofford & Durkee, LLP (57) ABSTRACT

An apparatus for performing interference cancellation is disclosed, comprising: a first electro-optic (EO) modulator configured to modulate a received RF signal onto a first optical carrier signal to generate a first modulated signal; a plurality of base signal sources configured to generate a plurality of base signals; an optical combiner coupled to the plurality of base signal sources, the optical combiner being configured to combine the base signals into a second optical carrier signal; a second EO modulator configured to modulate a reference signal onto the second optical carrier signal to generate a second modulated signal; and a subtraction element that is coupled to the first EO modulator and the refractive element, the subtraction element being configured to subtract the tapped delay line signal from the first modulated signal to generate an output signal.

20 Claims, 5 Drawing Sheets

(56) References Cited

U.S. PATENT DOCUMENTS

| | | | |
|---|---|---|---|
| 9,935,680 B2 | 4/2018 | Cox et al. | |
| 2005/0207756 A1* | 9/2005 | Tanaka | H04J 14/02 |
| | | | 398/85 |
| 2006/0204171 A1* | 9/2006 | Cai | H04B 10/25133 |
| | | | 385/24 |
| 2009/0129778 A1* | 5/2009 | Phillips | H04B 10/2507 |
| | | | 398/65 |
| 2012/0121220 A1* | 5/2012 | Krummrich | H04B 10/2581 |
| | | | 385/28 |
| 2013/0230328 A1* | 9/2013 | Fan | H04B 10/25759 |
| | | | 398/115 |
| 2013/0309975 A1* | 11/2013 | Kpodzo | H04B 1/1027 |
| | | | 455/63.1 |
| 2013/0336665 A1* | 12/2013 | Suzuki | H04B 10/611 |
| | | | 398/208 |
| 2014/0204808 A1* | 7/2014 | Choi | H04L 5/143 |
| | | | 370/278 |
| 2014/0219139 A1* | 8/2014 | Choi | H04L 5/1461 |
| | | | 370/278 |
| 2015/0192732 A1* | 7/2015 | Moselund | G02F 1/365 |
| | | | 385/76 |
| 2016/0380706 A1* | 12/2016 | Tanzi | H04B 1/525 |
| | | | 455/78 |
| 2018/0063745 A1* | 3/2018 | Jain | H04L 25/03006 |

OTHER PUBLICATIONS

Wangwei Zhou, Peng Xiang, Zhenyi Niu, Min Wang, Shilong Pan, Wideband Optical Multipath Interference Cancellation Based on a Dispersive Element, IEEE, vol. 28, No. 8, Apr. 15, 2016, pp. 849-851, 3 pages.

John Suarez, Konstantin Kravtsov, Paul R. Prucnal, Incoherent Method of Optical Interference Cancellation for Radio-Frequency Communications, IEEE, vol. 45, No. 4, Apr. 2009, pp. 402-408, 7 pages.

PCT Notification of Transmittal of the International Search Report and Written Opinion of the International Searching Authority, or the Declaration, PCT/US2019/046991; dated Nov. 14, 2019, 1 page.

PCT International Search Report, PCT/US2019/046991, dated Nov. 14, 2019, 6 pages.

PCT Written Opinion of the ISA, PCT/US2019/046991; dated Nov. 14, 2019, 10 pages.

* cited by examiner

PHOTONICS INTERFERENCE CANCELER

BACKGROUND

In wireless systems, co-site interference may occur when a receiver antenna takes over part of the signal transmitted by a collocated transmitter antenna. As a result, the signal of interest, which the receiver antenna is intended to receive, may be corrupted by noise resulting from a transmit signal that is output from the transmitter antenna. This problem is present especially in systems that perform communications over large distances, and which may transmit signals at high levels to prevent signal loss and distortion. In such instances, interference canceller circuits may be utilized to remove noise resulting from co-site interference. Such canceller circuits, however, may lack sufficient accuracy of noise removal and/or be too bulky to be used efficiently in space-constrained applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a photonic integrated circuit for performing interference cancellation is disclosed, comprising: a substrate; a first terminal for receiving an RF signal; a second terminal for receiving a reference signal; a third terminal for outputting an output signal; a first electro-optic (EO) modulator formed on the substrate, the first EO modulator being coupled to the first terminal, the first EO modulator being configured to modulate the RF signal onto a first optical carrier signal to generate a first modulated signal; an optical combiner formed on the substrate, the optical combiner being configured to combine a plurality of base signals into a second optical carrier signal, each one of the plurality of base signals having a respective wavelength that is different from the respective wavelengths of the remaining base signals in the plurality; a second EO modulator that is formed on the substrate, the second EO modulator being coupled to the second terminal and the optical combiner, the second EO modulator being configured to modulate the reference signal onto the second optical carrier signal to generate a second modulated signal, the second modulated signal including a plurality of modulated signal components, each modulated signal component corresponding to a different one of the base signals; a dispersive element that is formed on the substrate, the dispersive element being coupled to the second EO modulator, the dispersive element being configured to generate a tapped delay line signal by imparting a different respective delay on each of the modulated signal components of the second modulated signal; and a subtraction element that is formed on the substrate, the subtraction element being coupled to the first EO modulator, the dispersive element, and the third terminal, the subtraction element being configured to subtract the tapped delay line signal from the first modulated signal to generate the output signal.

According to aspects of the disclosure an apparatus for performing interference cancellation is disclosed, comprising: a first electro-optic (EO) modulator configured to modulate a received RF signal onto a first optical carrier signal to generate a first modulated signal; a plurality of base signal sources configured to generate a plurality of base signals, each base signal source being configured to generate a different one of the base signals, each one of the plurality of base signals having a respective wavelength that is different from the respective wavelengths of the remaining base signals in the plurality; an optical combiner coupled to the plurality of base signal sources, the optical combiner being configured to combine the base signals into a second optical carrier signal; a second EO modulator configured to modulate a reference signal onto the second optical carrier signal to generate a second modulated signal, the second modulated signal including a plurality of modulated signal components, each modulated signal component corresponding to a different one of the base signals; a dispersive element coupled to the second EO modulator, the dispersive element being configured to generate a tapped delay line signal by imparting a different respective delay on each of the modulated signal components of the second modulated signal; and a subtraction element that is coupled to the first EO modulator and the dispersive element, the subtraction element being configured to subtract the tapped delay line signal from the first modulated signal to generate an output signal.

According to aspects of the disclosure, a method for interference cancellation is disclosed, comprising: modulating a received RF signal onto a first optical carrier signal to generate a first modulated signal; generating a plurality of base signals, each one of the plurality of base signals having a respective wavelength that is different from the respective wavelengths of the remaining base signals in the plurality; combining the base signals into a second optical carrier signal; modulating a reference signal onto the second optical carrier signal to generate a second modulated signal, the second modulated signal including a plurality of modulated signal components, each modulated signal component corresponding to a different one of the base signals; generating a tapped delay line signal by imparting a different respective delay on each of the modulated signal components of the second modulated signal, the tapped delay line signal being generated using a dispersive element; and subtracting the tapped delay line signal from the first modulated signal to generate an output signal.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

According to aspects of the disclosure, an example circuit is disclosed for performing interference cancellation on an input RF signal. The input RF signal is received from a receiver antenna, and it may corrupted by noise caused by transmissions from a transmitter antenna. The circuit is configured to modulate the input RF signal onto a first optical carrier signal. The circuit is further configured to modulate a reference signal associated with the transmissions from the transmitter antenna onto a second optical carrier signal, generate a tapped delay line signal based on the optical carrier signal, and subtract the tapped delay line signal from the optical carrier signal to remove at least some of the noise in the input RF signal that is caused by interference from the transmitter antenna.

In some implementations, the second optical carrier signal may be generated by combining respective base signals. Each of the base signal sources may be generated by a different one of a plurality of base signal sources. Each of the base signals may have a wavelength that is different from the wavelengths of the remaining base signals. The base signals may be combined to produce the second optical carrier signal by using an optical combiner. In some implementations, the optical combiner may include a series of on-chip silicon waveguides, series of on-chip silicon nitride waveguides, edge couplers, vertical couplers, a network of silicon or silicon nitride waveguide y-junctions, and/or any other suitable type of optical combiner. The tapped delay line signal may be generated by using a dispersive element to impart a different respective delay on each of a plurality of components of the modulated second optical carrier signal. The dispersion element may include a Bragg or another type of grating element, a timed waveguide filter designed to have a desired dispersion, and/or any other suitable type of dispersion element.

In some implementations, the circuit for performing interference cancellation may be implemented as a photonic integrated circuit (PIC). In such instances, the circuit's components may be formed on the same substrate and encapsulated in the same integrated circuit package. In some aspects, integrating the circuit onto the same substrate may be facilitated by a dispersion element to generate the tapped delay line signal, because the dispersion element can be scaled down to a smaller size than other comparable solutions for generating delay between the tapped delay line signals, and which is amenable to being formed by using standard semiconductor fabrication techniques. Implementing the circuit interference cancellation as a photonic integrated circuit may help reduce the circuit's footprint, thereby making it suitable for various space-constrained applications, such as applications related to active electronically-scanned arrays (AESAs). Furthermore, implementing the circuit interference cancellation as a photonic integrated circuit may help reduce the circuit's power requirements.

Figure 1:
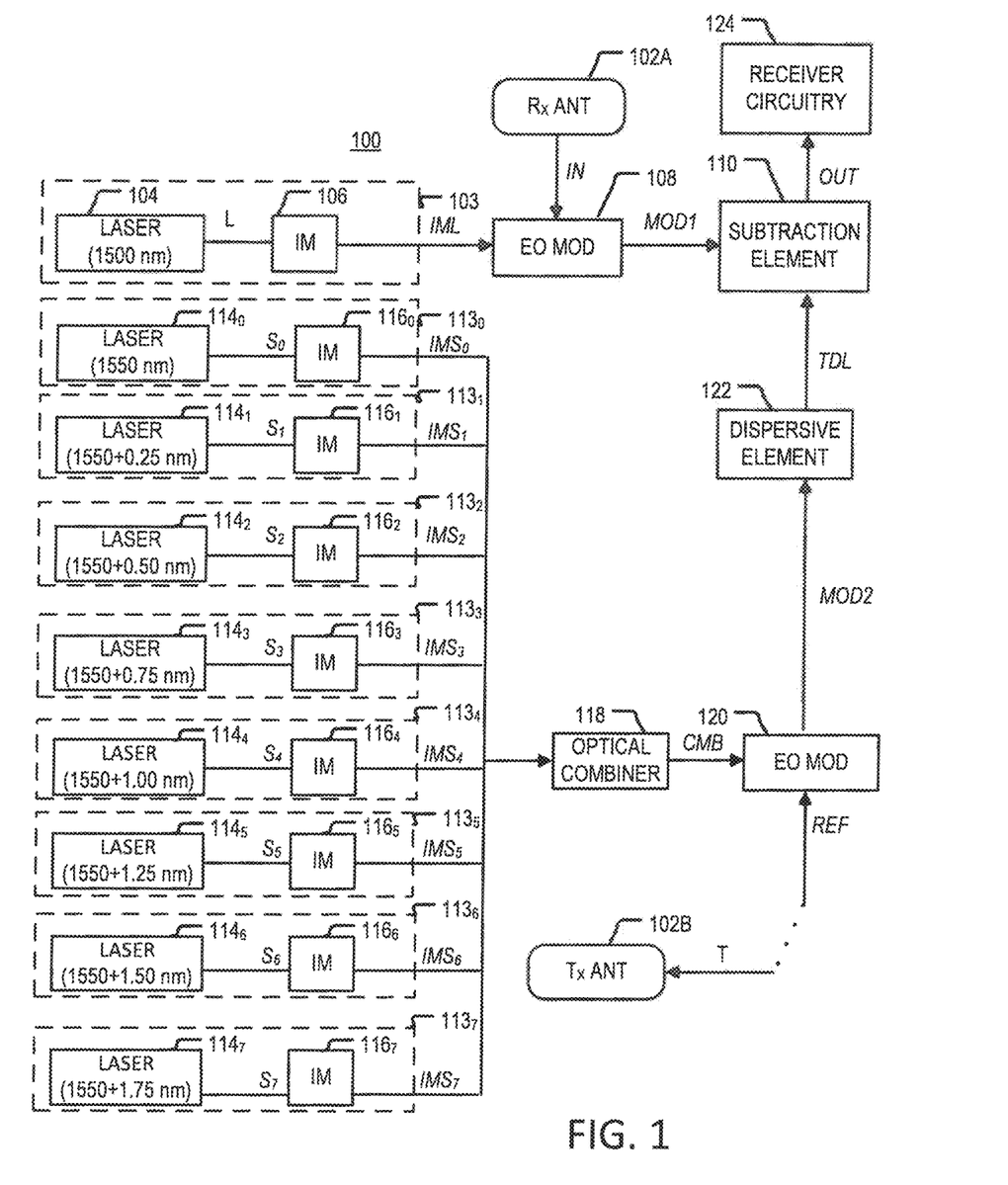
FIG. 1 is a diagram of an example of a canceller circuit, according to aspects of the disclosure.

FIG. 1 is a diagram of an example of a circuit 100 for performing interference cancellation, according to aspects of the disclosure. The circuit 100 is configured to receive an input signal IN and output an output signal OUT that is produced by removing at least some transmit leakage noise that is present in the input signal IN. The input signal IN may be a signal that is received from a receiver antenna 102A and it may be corrupted with leakage that is caused by a collocated transmitter antenna 102B. The transmitter antenna 102B is configured to transmit a signal T, which is received by the receiver antenna 102A together with a signal-of-interest (SOI), which the receiver antenna 102A is intended to receive. In this regard, the input signal IN may include the signal-of-interest and noise resulting from the reception of the signal T at the receiver antenna 102.

The noise resulting from the reception of the signal T may have higher power than the signal-of-interest, and as such, it may obscure the signal-of-interest if it is not removed, by the circuit 100, from the input signal IN. To remove the noise, the circuit 100 may rely on a reference signal REF. The reference signal REF may be the same as the signal T and/or another signal that is generated at least in part based on the signal T. The circuit 100 may generate the output signal OUT by subtracting the reference signal REF from the input signal IN, after each of the signals has undergone one or more transformations. In this regard, the output signal OUT may be a filtered version of the signal IN, which lacks at least some of the noise components that are introduced into the signal IN due to leakage from the transmitter antenna 102B.

The circuit 100 includes a signal source 103 that is configured to generate a first optical carrier signal IML. The signal source 103 may include a light source 104 that is coupled to an intensity modulator 106. According to the present example, the light source 104 is a laser diode configured to produce emissions having a wavelength B of approximately 1550 nm. Although in the present example the light source is configured to produce emissions in the near-infrared band, alternative implementations are possible in which the light source is configured to produce another type of emissions, such as emissions in the infrared band or emissions in the visible light band. Stated succinctly, the present disclosure is not limited to any specific implementation of the light source 104 and/or emissions produced by the light source 104.

The light source 104 may be configured to generate light a signal L and feed the generated signal L to an intensity modulator 106. The intensity modulator 106 may be configured to increase the intensity of the signal L to produce the first optical carrier signal IML. The intensity modulator 106 may feed the first optical carrier signal IML to an electro-optic (EO) modulator 108, as shown. The EO modulator 108 may be configured to receive the first optical carrier signal IML and the input signal IN as its inputs. The EO modulator 108 may be further configured to modulate the input signal IN onto the first optical carrier signal IML to generate a modulated signal MOD1. The EO modulator 108 may be further configured to feed the modulated signal MOD1 to a subtraction element 110 for further processing. The EO modulator 108 may include a Ti:LiNbOO03 Mach-Zehnder electrooptic modulator, a microdisk modulator, a ring modulator, a travelling wave optical modulator, and/or any other suitable type of EO modulator. The intensity modulator may include an analog Mach-Zehnder modulator, a ring modulator, a travelling wave optical modulator, and/or any other suitable type of intensity modulator.

The circuit 100 further includes a plurality of base signal sources $113_i$, where i is an integer greater than or equal to zero and less than or equal to the total count of the base signal sources 113. Although in the present example, the circuit 100 includes a total of eight base signal sources $113_i$, the present disclosure is not limited thereto. In some implementations, the circuit 100 may include only two base sources 113. Additionally or alternatively, in some implementations, the circuit 100 may include three or more base signal sources $113_i$ (e.g., 3 light sources, 5 light sources, 10 light sources, etc.). According to aspects of the disclosure, including three or more base signal sources $113_i$ into the circuit 100 is advantageous because it allows for more accurate removal of noise from the input signal IN than when fewer than three base signal sources 113 are used in the circuit 100.

Each of the base signal sources $113_i$ may be configured to output a respective base signal $IML_i$ having a wavelength $W_i$ that is determined in accordance with Equation 1, below:

$$W_i = B + i*s \qquad (Eq. 1)$$

, where B is the base wavelength discussed above and s is an incremental step. As noted above, according to the present example, the base wavelength B is equal to approximately 1550 nm. Although in the present example the base signal sources $113_i$ are configured to produce emissions in the near-infrared band, alternative implementations are possible in which the light source is configured to produce another type of emissions, such as emissions in the infrared band or emissions in the visible light band. Stated succinctly, the present disclosure is not limited to any specific type of emissions being produced by the base signal sources $103_i$. According to the present example, the incremental step s is equal to approximately 0.25 nm. However, alternative implementations are possible in which the incremental step s has a different value, such as 0.5 nm or 1 nm, for example. Stated succinctly, the present disclosure is not limited to any specific value for the base wavelength B and/or incremental step s.

Each of the base signal sources $113_i$ may include a respective light source $114_i$ and a respective intensity modulator $116_i$. Each of the light sources $114_i$ may be configured to generate a signal $S_i$ and feed the generated signal $S_i$ to the intensity modulator $116_i$ that is part of the same base signal source $113_i$ as the light source $114_i$. Each intensity modulator $116_i$ may increase the intensity of the signal $S_i$ that is received at that intensity modulator $116_i$ to generate a different one of the base signals $IMS_i$. Each intensity modulator $116_i$ may be configured to feed the base signal $IMS_i$ that is generated by the intensity modulator $116_i$ to an optical combiner 118, as shown. In some implementations, any of the light sources $114_i$ may include a laser diode, such as an InP laser diode, an InGaAsP laser diode, a GaN laser diode, and/or any other suitable type of laser diode. Additionally or alternatively, in some implementations, any of the intensity modulators an analog Mach-Zehnder modulator, a ring modulator, a travelling wave optical modulator and/or any other suitable type of intensity modulator.

Each signal $S_i$ may also have a wavelength that is determined in accordance with Equation 1 above. As noted above, according to the present example, the base wavelength is equal to approximately 1550 rm. However, it will be understood that alternative implementations are possible in which the base wavelength B has another value. Although in the present example, the size of the incremental step s is 0.25 nm, it will be understood that alternative implementations are possible in which the step s has another value (e.g., 0.4 nm, 0.5 nm, 1 nm, etc.) In some implementations, the step s may be non-uniform across the range of base signals IMS. For example, the difference between the respective wavelengths of base signals $IMS_0$ and $IMS_i$ may have a first magnitude (e.g., 0.25 nm) and the difference between the respective wavelengths of the signals $IMS_2$ and $IMS_3$ may have a second magnitude (e.g., 0.5 nm) that is different from the first magnitude. Additionally or alternatively, in some implementations, the minimum size of the step s may be greater than or equal to the resolution of any of the light sources $114_i$. For example, if the emissions from the light sources $114_i$ can be changed in increments of X nm, the size of the step s may also be greater than or equal to X nm. Stated succinctly, the present disclosure is not limited to any specific wavelength of the emissions from the base signal sources $113i$ and/or any specific size of the step s. According to the present example, the light source $114_1$ is configured to emit light having a wavelength of 1550 nm; the light source $114_1$ is configured to produce a signal $S_1$ having a wavelength of 1550.25 nm; the light source $114_2$ is configured to produce a signal $S_2$ having a wavelength of 1550.50 nm; the light source $114_3$ is configured to produce a signal $S_3$ having a wavelength of 1550.75 nm; the light source $114_4$ is configured to produce a signal $S_4$ having a wavelength of 1551.00 nm; the light source $114_5$ is configured to produce a signal $S_5$ having a wavelength of 1551.25 nm; the light source $114_6$ is configured to produce a signal having wavelength of 1551.50 nm; and the light source $114_7$ is configured to produce a signal having a wavelength of 1551.75 nm.

The optical combiner 118 is configured to receive each of the base signals $IMS_i$ that are generated by the base signal sources $113_i$ and combine them into a second optical carrier signal CMB. The optical combiner 118 is further configured to feed the second optical carrier signal CMB to an EO modulator 120. The EO modulator 120 is configured to receive the second optical carrier signal CMB and the reference signal REF as inputs. The EO modulator 120 is further configured to modulate the reference signal REF onto the second optical carrier signal CMB to generate a modulated signal MOD2. The EO modulator 120 is further configured to feed the modulated signal MOD2 to a dispersive element 122, as shown. In some implementations, the optical combiner may include a series of on-chip silicon waveguides, series of on-chip silicon nitride waveguides, edge couplers, vertical couplers, a network of silicon or silicon nitride waveguide y-junctions, and/or any other suitable type of optical combiner. Additionally or alternatively, in some implementations, the EO modulator 120 may include Ti:LiNbO03 Mach-Zehnder electrooptic modulator, a microdisk modulator, a ring modulator, a travelling wave optical modulator and/or any other suitable type of EO modulator.

The dispersive element 122 may be configured to receive the modulated signal MOD2 as an input, and generate a tapped delay line signal TDL that models the dispersive channel between the receiver antenna 102A and the transmitter antenna 102B. In some implementations, the dispersive element 122 may feed the tapped delay line signal TDL to the subtraction element 110. The subtraction element 110 may be configured to receive the modulated signal MOD1 and the tapped delay line signal TDL as its inputs, and generate the output signal OUT as its output. In some implementations, the output signal OUT may be equal to the difference between the modulated signal MOD1 and the tapped delay line signal TDL, and it may be generated by subtracting the tapped delay line signal TDL from the modulated signal MOD1. The output signal OUT may be fed to a receiver circuitry 124 for further processing. The receiver circuitry 124 may include any suitable type of electronic circuitry for processing optical and/or RF signals. The present disclosure is not limited to any specific type of receiver circuitry, as the type of the receiver circuitry may depend on the particular application context in which the circuit 100 is deployed. For example, in some implementations, the receiver circuitry 124 may include an active electronically scanned array (AESA) circuitry.

According to the present example, the dispersive element 122 comprises a Bragg grating element having a dispersion value that is equal to approximately 400 ps/nm. However, alternative implementations are possible in which another dispersive element is used, such as a Bragg or other grating element, a tuned waveguide filter designed to have a desired dispersion, and/or any other suitable type of dispersive element. Furthermore, in the present example, the subtraction element 110 is a balanced photodetector. However, in some implementations, the subtraction element 110 may include balanced photodiodes and/or any other suitable type of subtraction element. Stated succinctly, the present disclosure is not limited to any specific implementation of the dispersive element 122 and/or the subtraction element 110. Although in the present example, the dispersive element 122 has a dispersion value that is equal to approximately 400 ps/nm, alternative implementations are possible in which the dispersive element has another dispersion value (e.g., 1000 ps/nm, 300 ps/nm, etc.)

Figure 2:
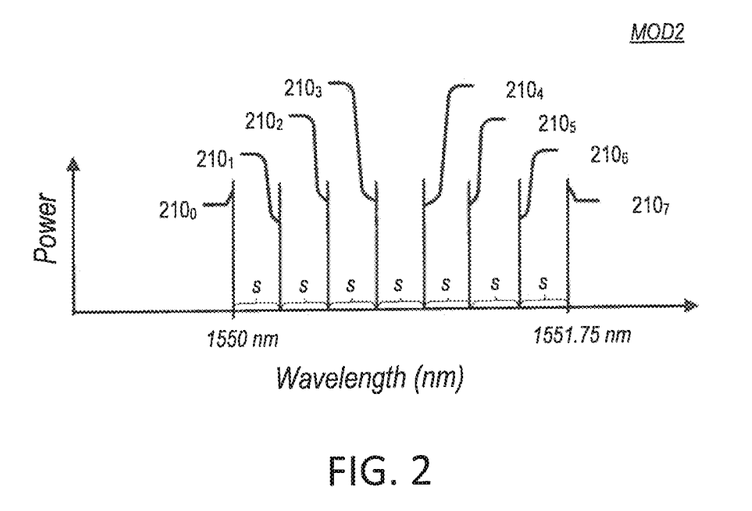
FIG. 2 is a graph illustrating an example of a modulated signal, according to aspects of the disclosure.

FIG. 2 is a diagram illustrating the spectral composition of the modulated signal MOD2, according to aspects of the disclosure. As illustrated, the modulated signal MOD2 includes a plurality of modulated signal components $210_i$. According to the present example, each modulated signal component 210 corresponds to a different one of the base signals $IMS_i$. More particularly, in some implementations, the modulated signal component $210_0$ may correspond to the base signal $IMS_0$; the modulated signal component $210_1$ may correspond to the base signal $IMS_1$; the modulated signal component $210_2$ may correspond to the base signal $IMS_2$; the modulated signal component $210_3$ may correspond to the base signal $IMS_3$; the modulated signal component $210_4$ may correspond to the base signal $IMS_4$; the modulated signal component $210_5$ may correspond to the base signal $IMS_5$; the modulated signal component $210_6$ may correspond to the base signal $IMS_6$; and the modulated signal component $210_7$ may correspond to the base signal $IMS_7$. In accordance with the present example, the respective wavelengths of any two adjacent modulated signal components 210 may be apart by 0.25 nm. Separating the wavelengths of the modulated signal components 210 in this manner allows the dispersive element 122 to impart a different respective delay on each of the modulated signal components 210 of the modulated signal MOD2 when the modulated signal MOD2 is passed through the dispersive element 122 to generate the tapped delay line signal TDL.

Figure 3:
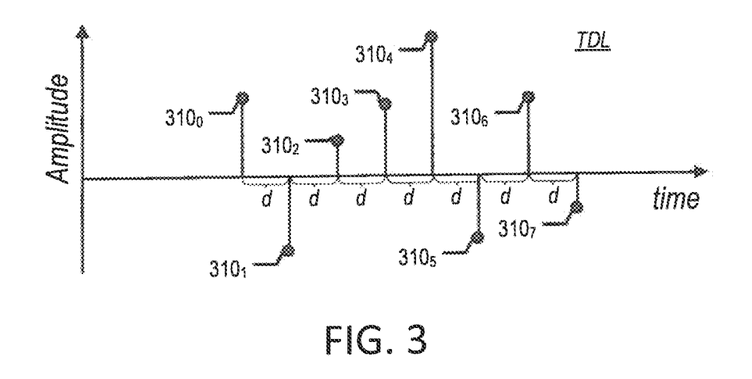
FIG. 3 is a graph illustrating an example of a tapped delay line signal that is generated based on the modulated signal of FIG. 2, according to aspects of the disclosure.

FIG. 3 is a diagram of the tapped delay line signal TDL, according to aspects of the disclosure. According to the present example, the tapped delay line signal TDL defines a plurality of tap points 310 that model the dispersive channel between the receiver antenna 102A and the transmitter antenna 102B. Each of the tap points $310_i$ corresponds to the value of a different one of the modulated signal components 210, at the same time instant. However, each of the tap points $310_i$ is separated from any adjacent tap points 310 by a delay period d. In the present example, the delay period d is equal to 100 ps, and it is derived from the step s (which defines the wavelength separation between different base signals $IMS_i$) and the dispersive value of the dispersive element 122. As noted above, the delay period d is imparted on the modulated signal components 210 by the dispersive element 122, which in the present example has a dispersion value of 400 ps/nm. In some implementations, a plurality of modulated signal components are generated at the same time instant, if they are generated during a time period that is shorter than the dispersion value of the dispersive element 122 (e.g., a 50 ps period). Additionally or alternatively, in some implementations, a plurality of modulated signal components are generated at the same time instant, if they are generated at approximately the same time.

According to the present example, the tap point $310_0$ corresponds to the modulated signal component $210_0$. The tap point $310_1$ corresponds to the modulated signal component $210_1$ and it is delayed relative to the tap point $310_0$ by 100 ps, as a result of the modulated signal component $210_1$ having a wavelength that is 0.25 nm greater than the wavelength of the modulated signal component $210_0$. The tap point $310_2$ corresponds to the modulated signal component $210_2$ and it is delayed relative to the tap point $310_1$ by 100 ps, as a result of the modulated signal component $210_2$ having a wavelength that is 0.25 nm greater than the wavelength of the modulated signal component $210_1$. The tap point $310_3$ corresponds to the modulated signal component $210_3$ and it is delayed relative to the tap point $310_2$ by 100 ps, as a result of the modulated signal component $210_3$ having a wavelength that is 0.25 nm greater than the wavelength of the modulated signal component $210_2$. The tap point $310_4$ corresponds to the modulated signal component $210_4$ and it is delayed relative to the tap point $310_3$ by 100 ps, as a result of the modulated signal component $210_4$ having a wavelength that is 0.25 nm greater than the wavelength of the modulated signal component $210_3$. The tap point $310_5$ corresponds to the modulated signal component $210s$ and it is delayed relative to the tap point $310_4$ by 100 ps, as a result of the modulated signal component $210_5$ having a wavelength that is 0.25 nm greater than the wavelength of the modulated signal component $210_4$. The tap point $310_6$ corresponds to the modulated signal component $210_6$ and it is delayed relative to the tap point $310s$ by 100 ps, as a result of the modulated signal component $210_6$ having a wavelength that is 0.25 nm greater than the wavelength of the modulated signal component $210s$. And the tap point $310_7$ corresponds to the modulated signal component $210_7$ and it is delayed relative to the tap point $310_6$ by 100 ps, as a result of the modulated signal component $210_7$ having a wavelength that is 0.25 nm greater than the wavelength of the modulated signal component $210_7$.

Figure 4:
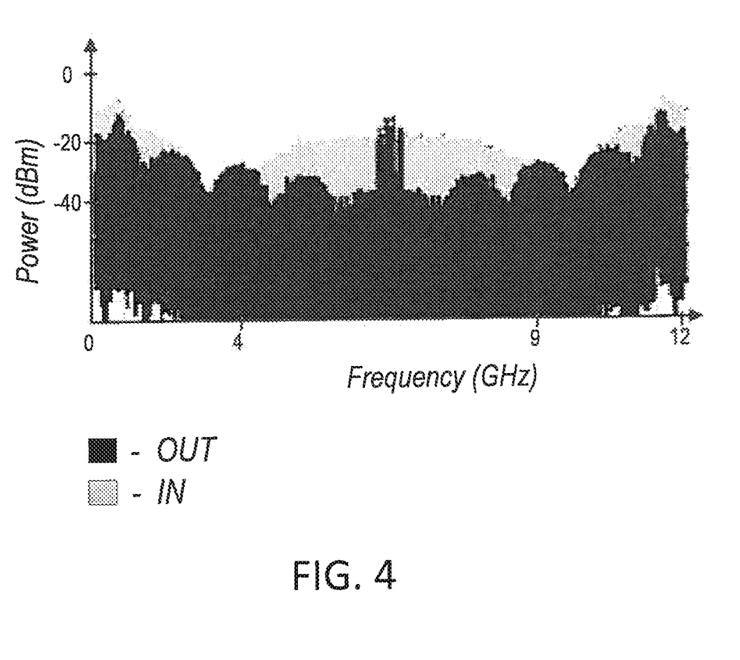
FIG. 4 is a graph illustrating the performance of the canceller circuit of FIG. 1, according to aspects of the disclosure.

FIG. 4 is a graph illustrating the performance of the circuit 100, in accordance with one particular implementation. As illustrated, the circuit 100 has a bandwidth of approximately 11 GHz, and it provides noise cancelation of approximately 20 dB, in the range of 4-9 GHz. In some aspects, the use of multiple (e.g., three or more) base signal sources $113_i$ to generate the base signals $IMS_i$, which are ultimately used to produce the tapped delay line signal TDL, may help the circuit 100 have an extended bandwidth. Furthermore, in some aspects, the use of three or more base signal sources $113_i$ to generate the base signals $IMS_i$ may help increase the accuracy with which the circuit 100 removes noise from the input signal IN. As illustrated in FIG. 4, the multi-tone signal of interest centered at 6.5 GHz that was buried in the leakage noise in the IN signal can be seen is not cancelled and become discernable from the transmit leakage noise after cancellation, in the OUT signal.

Figure 5:
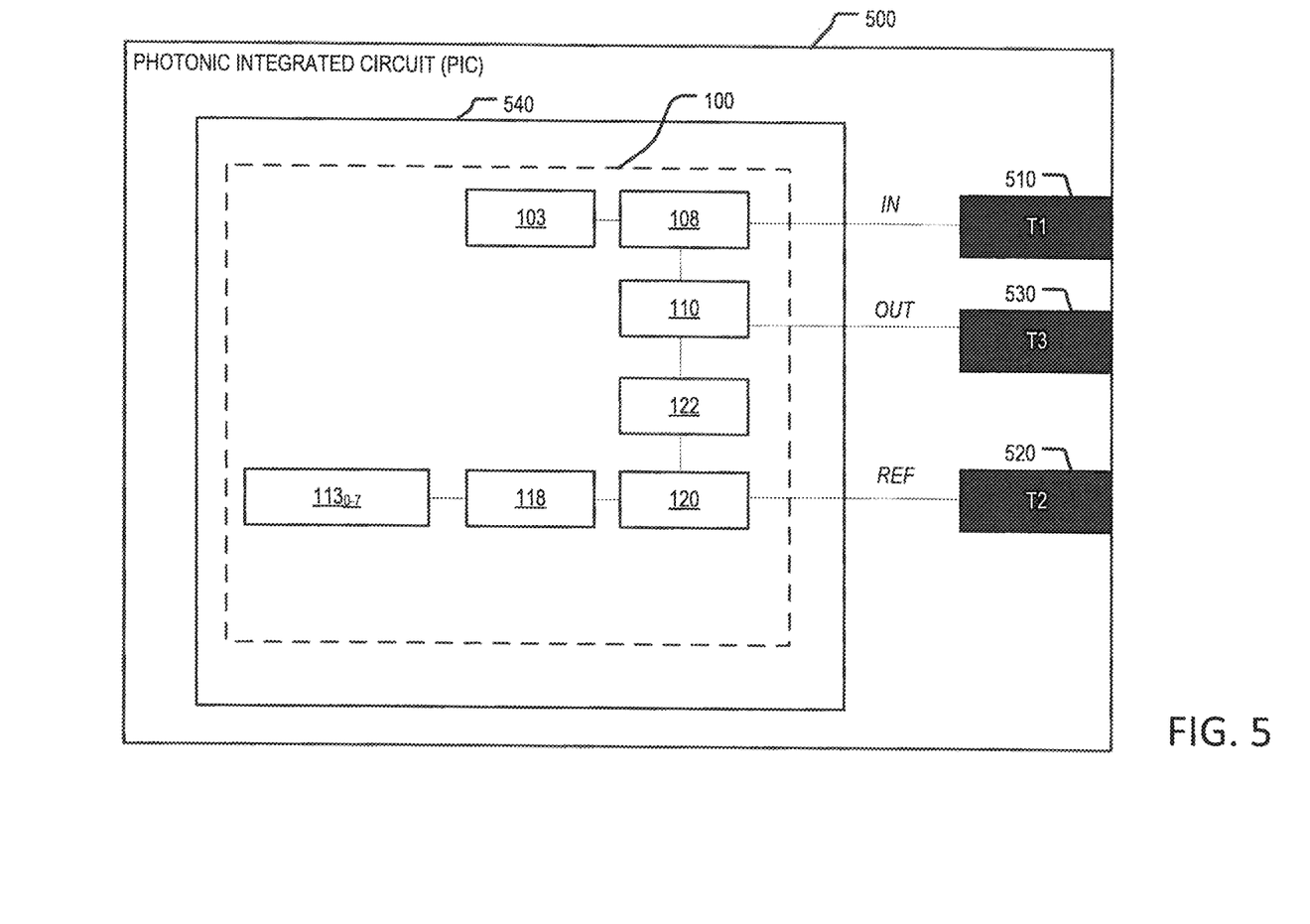
FIG. 5 is a diagram of an example of a package encapsulating the canceller circuit of FIG. 1, according to aspects of the disclosure.

FIG. 5 is a diagram of a photonic integrated circuit (PIC) 500, which incorporates the circuit 100 of FIG. 1. As illustrated, the PIC 500 includes a terminal for receiving the input signal IN, a terminal 520 for receiving the reference signal REF, a terminal 530 for outputting the signal OUT, and a substrate 540. In some implementations, each of the signal source 103, the base signal sources 113, the EO modulator 108, the optical combiner 118, the EO modulator 120, the dispersive element 122, and the subtraction element 110 may be formed on the substrate 540 as shown. In some implementations, the terminal 510, may be coupled to the EO modulator 108, as shown. The terminal 520 may be coupled to the EO modulator 120, as shown. And the terminal 530 may be coupled to the subtraction element 110. In some implementations, the substrate 540 may include a silicon substrate, a GaAs substrate, and/or any other suitable type of substrate. Furthermore, in implementations in which the circuit 100 is integrated into a photonic integrated circuit, such as the PIC 500, each of the light sources 104 and 114 may include a laser diode that is formed by using AlGaAs material system and/or any other suitable type of material system. Additionally or alternatively, in implementations in which the circuit 100 is integrated into a photonic integrated circuit, such as the PIC 500, the dispersive element 122 may include a Bragg grating element. As can be readily appreciated, using a Bragg grating element to generate a tapped delay line signal, such as the signal TDL may be advantageous, as Bragg grating elements can be formed using readily available epitaxial growth processes. As discussed above, integrating the circuit 100 into a photonic integrated circuit may be advantageous as it could reduce the circuit's 100 power requirements and footprint, making it suitable for use in various space-constrained applications, such as applications relating to actively electronically scanned arrays (AESAs).

Although in the present example, each of the signal source 103, the base signal sources 113, the EO modulator 108, the optical combiner 118, the EO modulator 120, the dispersive element 122, and the subtraction element 110 is formed on the substrate 540, alternative implementations are possible in which only some of the signal source 103, the base signal sources 113, the EO modulator 108, the optical combiner 118, the EO modulator 120, the dispersive element 122, and the subtraction element 110 are formed on the substrate 540. For example, in some implementations, the EO modulators 108 and 120, the optical combiner 118, the dispersive element 122, and the subtraction element may be formed on the substrate 540, while the remaining components of the circuit 100 may or may not be formed on the substrate 540. Although in the present example the signal sources 113 are provided on the substrate 540, alternative implementations are possible in which the signal sources 113 are not formed on the substrate 540 and/or are provided externally instead. More particularly, although in the present example the laser diodes 114 are provided on the substrate 540, alternative implementations are possible in which the laser diodes 114 are not formed on the substrate 540, and/or are provided externally instead. Additionally or alternatively, although in the present example the signal source 103 is provided on the substrate 540, alternative implementations are possible in which the signal source 103 is not provided on the substrate 540 and/or is provided externally instead. More particularly, although in the present example the laser diode 104 is provided on the substrate 540, alternative implementations are possible in which the laser diode 104 is not provided on the substrate 540 and/or is provided externally instead. Stated succinctly, the present disclosure is not limited to any specific configuration for integrating the circuit 100 (or a portion thereof) into a photonic integrated circuit.

Figure 6:
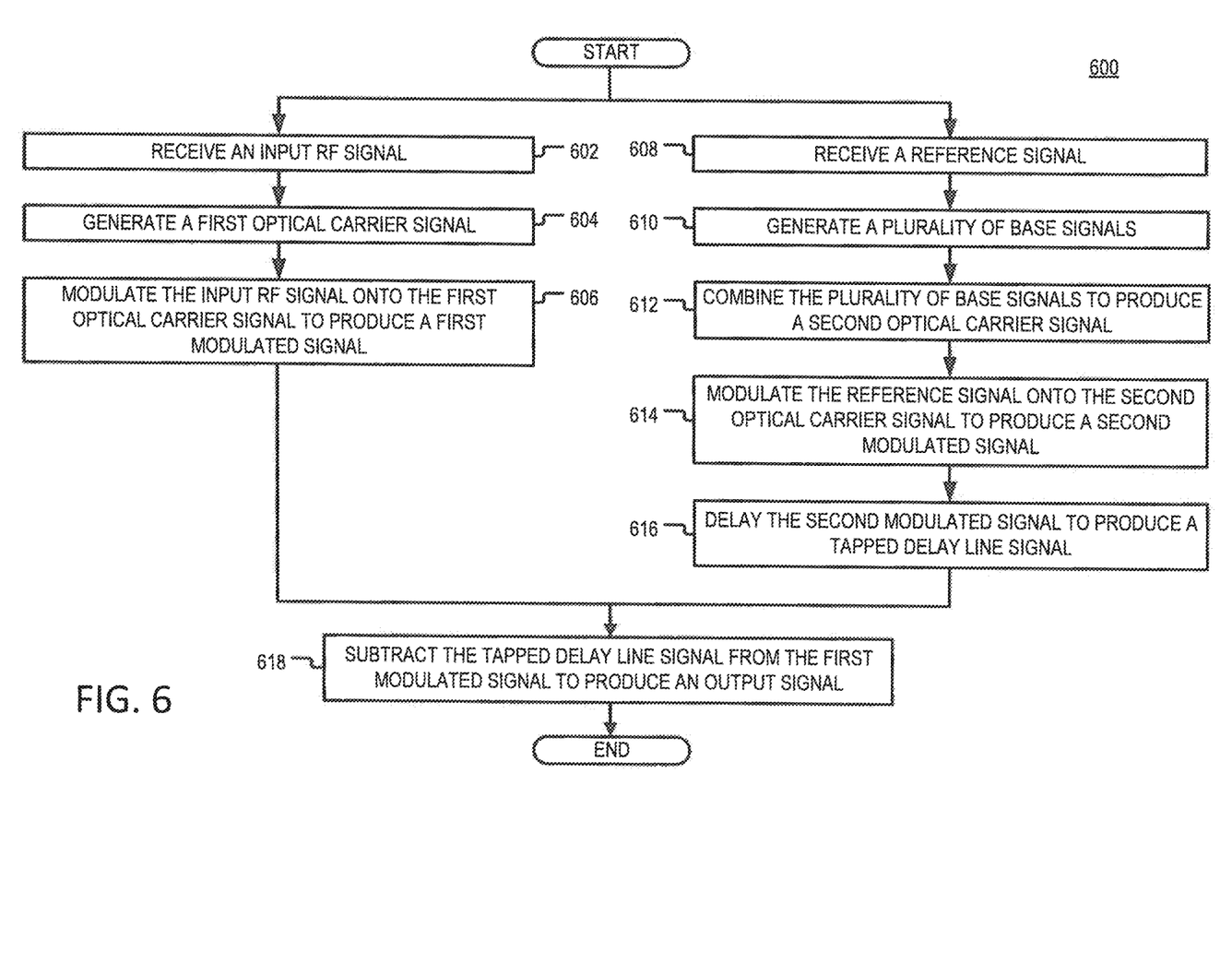
FIG. 6 is a flowchart of an example of a process for interference cancellation, according to aspects of the disclosure.

FIG. 6 is a flowchart of an example of a process 600 for performing interference cancellation, according to aspects of the disclosure. The process 600 is provided as an example. At least some of the steps in the process 600 may be performed in a different order and/or altogether omitted.

At step 602, an input RF signal is received. In some implementations, the input RF signal may be received from a receiver antenna, such as the receiver antenna 102A, and/or an RF subsystem that is coupled to the receiver antenna. In some implementations, the input RF signal may be corrupted by noise due to RF interference that is caused by a transmitter antenna located within the reception range of the receiver antenna (e.g., a transmitter antenna that is collocated with the receiver antenna).

At step 604, a first optical carrier signal is generated. In some implementations, the first optical carrier signal may have a wavelength of approximately 1500 nm, and/or any other suitable wavelength. Additionally or alternatively, in some implementations, the optical carrier signal may be generated using a signal source, such as the signal source 103, which is discussed above with respect to FIG. 1.

At step 606, the input RF signal is modulated onto the first optical carrier signal. In some implementations, the input RF signal may be modulated onto the first optical carrier signal by using an optical modulator, such as the EO modulator 108, which is discussed above with respect to FIG. 1.

At step 608, a reference signal is received. As noted above, in some implementations, the reference signal may be a replica of a transmit signal that is the cause of RF interference in the input RF signal. Additionally or alternatively, in some implementations, the reference signal may be any signal that is at least in part generated based on the transmit signal.

At step 610, a plurality of signals base signals is generated. Each base signal in the plurality may have a different wavelength than any of the remaining base signals in the plurality. In some implementations, each base signal may be generated by using a different base signal source, as discussed above with respect to FIG. 1.

At step 612, the base signals are combined into a second optical carrier signal. In some implementations, the base signals may be combined by using an optical combiner, such as the optical combiner 118, which is discussed above with respect to FIG. 1.

At step 614, the reference signal is modulated onto the second optical carrier signal to produce a second modulated signal. In some implementations, the second modulated signal may include a plurality of modulated signal components that have different respective wavelengths, as discussed above with respect to FIG. 2. Additionally or alternatively, in some implementations, each of the modulated signal components may be associated with different one of the plurality of base signals generated at step 610.

At step 616, a tapped delay line signal is generated based on the second modulated signal. In some implementations, the tapped delay line signal may model the dispersive path between the receiver antenna and the transmitter antenna, and it may well-suited for removing multi-path interference from the input RF signal. In some implementations, the tapped delay line signal may be generated by using a dispersive element, such as the dispersive element 122, to impart a different respective delay on at least some of the components of the second modulated signal.

At step 618, an output signal is generated by subtracting the tapped delay line signal from the first modulated signal generated at step 606. In some implementations, the tapped delay line signal may be subtracted from the first modulated signal by using a subtraction element, such as the subtraction element 110, which is discussed above with respect to FIG. 1.

Although in the example of FIGS. 1-6, the Although in the present example, the second optical carrier signal CMB is created using multiple signal sources 113, alternative implementations are possible in which only one signal source is used. In such implementations, the signal source may be configured produce an optical signal including multiple signal components that have wavelengths that are offset from one another by a predetermined step. For example, in some implementations, the signal source may be configured to produce a signal having at least a first signal component and a second signal component. The first component may have a first wavelength (e.g., 1550 nm) and the second component may have a second wavelength that is greater than the first wavelength (e.g., 1550.25). Furthermore, although in in the present example, each constituent signal IMS of the second optical carrier signal CMB is produced using a different signal source, alternative implementations are possible in which at least two of the signals IMS are produced using the same signal source. Stated succinctly, the present disclosure is not limited to any specific way of producing the optical carrier signal CMB.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term approximately shall be interpreted as "within 15%."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations, the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Also, for purposes of this description, it is understood that all gates are powered from a fixed-voltage power domain (or domains) and ground unless shown otherwise. Accordingly, all digital signals generally have voltages that range from approximately ground potential to that of one of the power domains and transition (slew) quickly. However and unless stated otherwise, ground may be considered a power source having a voltage of approximately zero volts, and a power source having any desired voltage may be substituted for ground. Therefore, all gates may be powered by at least two power sources, with the attendant digital signals therefrom having voltages that range between the approximate voltages of the power sources.

Signals and corresponding nodes or ports may be referred to by the same name and are interchangeable for purposes here.

It will be further understood that various changes in the details, materials, and arrangements of the parts which have been described and illustrated in order to explain the nature of the claimed invention might be made by those skilled in the art without departing from the scope of the following claims.

The invention claimed is:

1. A photonic integrated circuit for performing interference cancellation, comprising:
    a substrate;
    a first terminal for receiving an RF signal;
    a second terminal for receiving a reference signal;
    a third terminal for outputting an output signal;
    a first electro-optic (EO) modulator formed on the substrate, the first EO modulator being coupled to the first terminal, the first EO modulator being configured to modulate the RF signal onto a first optical carrier signal to generate a first modulated signal;
    an optical combiner formed on the substrate, the optical combiner being configured to combine a plurality of base signals into a second optical carrier signal, each one of the plurality of base signals having a respective wavelength that is different from the respective wavelengths of the remaining base signals in the plurality, the second optical carrier signal having a different spectral content than the first optical carrier signal;
    a second EO modulator that is formed on the substrate, the second EO modulator being coupled to the second terminal and the optical combiner, the second EO modulator being configured to modulate the reference signal onto the second optical carrier signal to generate a second modulated signal, the second modulated signal including a plurality of modulated signal components, each modulated signal component corresponding to a different one of the base signals;
    a dispersive element that is formed on the substrate, the dispersive element being coupled to the second EO modulator, the dispersive element being configured to generate a tapped delay line signal by imparting a different respective delay on each of the modulated signal components of the second modulated signal; and
    a subtraction element that is formed on the substrate, the subtraction element being coupled to the first EO modulator, the dispersive element, and the third terminal, the subtraction element being configured to subtract the tapped delay line signal from the first modulated signal to generate the output signal.

2. The photonic integrated circuit of claim 1, wherein the plurality of base signals includes at least three different signals $IMS_i$, each signal $IMS_i$ having a wavelength $W_i$ that is calculated in accordance with the equation:

$$W_i = B + i*s,$$

where i is an integer greater than or equal to zero and less than or equal to a total count of the base signals in the plurality of base signals, B is a base wavelength, and s is an incremental step.

3. The photonic integrated circuit of claim 2, wherein the base wavelength B is approximately 1550 nm, and the incremental step s is approximately 0.25 nm.

4. The photonic integrated circuit of claim 1, wherein the dispersive element has a dispersive value of approximately 400 ps/nm.

5. The photonic integrated circuit of claim 1, wherein the subtraction element includes a balanced photodetector.

6. The photonic integrated circuit of claim 1, further comprising a plurality of base signal sources formed on the substrate, wherein each base signal source is configured to produce a different one of the plurality of base signals and includes a respective laser diode and a respective intensity modulator that is coupled to the respective laser diode.

7. The photonic integrated circuit of claim 1, wherein the dispersive element includes a Bragg grating element.

8. An apparatus for performing interference cancellation, comprising:
    a first electro-optic (EO) modulator configured to modulate a received RF signal onto a first optical carrier signal to generate a first modulated signal;
    a plurality of base signal sources configured to generate a plurality of base signals, each base signal source being configured to generate a different one of the base signals, each one of the plurality of base signals having a respective wavelength that is different from the respective wavelengths of the remaining base signals in the plurality;
    an optical combiner coupled to the plurality of base signal sources, the optical combiner being configured to combine the base signals into a second optical carrier signal, the second optical carrier signal having a different spectral content than the first optical carrier signal;
    a second EO modulator configured to modulate a reference signal onto the second optical carrier signal to generate a second modulated signal, the second modulated signal including a plurality of modulated signal components, each modulated signal component corresponding to a different one of the base signals;
    a dispersive element coupled to the second EO modulator, the dispersive element being configured to generate a tapped delay line signal by imparting a different respective delay on each of the modulated signal components of the second modulated signal; and
    a subtraction element that is coupled to the first EO modulator and the dispersive element, the subtraction element being configured to subtract the tapped delay line signal from the first modulated signal to generate an output signal.

9. The apparatus of claim 8, wherein the plurality of base signals includes at least three different signals $IMS_i$, each signal $IMS_i$ having a wavelength $W_i$ that is calculated in accordance with the equation:

$$W_i = B + i*s,$$

where i is an integer greater than or equal to zero and less than or equal to a total count of the base signals in the plurality of base signals, B is a base wavelength, and s is an incremental step.

10. The apparatus of claim 9, wherein the base wavelength B is approximately 1550 nm, and the incremental step s is approximately 0.25 nm.

11. The apparatus of claim 8, wherein the dispersive element has a dispersive value of approximately 400 ps/nm.

12. The apparatus of claim 8, wherein the subtraction element includes a balanced photodetector.

13. The apparatus of claim 8, wherein each base signal source includes a respective laser diode and a respective intensity modulator that is coupled to the respective laser diode.

14. The apparatus of claim 8, wherein the dispersive element includes a Bragg grating element.

15. A method for interference cancellation, comprising:
modulating a received RF signal onto a first optical carrier signal to generate a first modulated signal;
generating a plurality of base signals, each one of the plurality of base signals having a respective wavelength that is different from the respective wavelengths of the remaining base signals in the plurality;
combining the base signals into a second optical carrier signal, the second optical carrier signal having a different spectral content than the first optical carrier signal;
modulating a reference signal onto the second optical carrier signal to generate a second modulated signal, the second modulated signal including a plurality of modulated signal components, each modulated signal component corresponding to a different one of the base signals;
generating a tapped delay line signal by imparting a different respective delay on each of the modulated signal components of the second modulated signal, the tapped delay line signal being generated using a dispersive element; and
subtracting the tapped delay line signal from the first modulated signal to generate an output signal.

16. The method of claim 15, wherein the plurality of base signals includes at least three different signals $IMS_i$, each signal $IMS_i$ having a wavelength $W_i$ that is calculated in accordance with the equation:

$$W_i = B + i*s,$$

where i is an integer greater than or equal to zero and less than or equal to a total count of the base signals in the plurality of base signals, B is a base wavelength, and s is an incremental step.

17. The method of claim 16, wherein the base wavelength B is approximately 1550 nm, and the incremental step s is approximately 0.25 nm.

18. The method of claim 16, wherein the dispersive element has a dispersive value of approximately 400 ps/nm.

19. The method of claim 16, wherein tapped delay line signal is subtracted from the first modulated signal by using a balanced photodetector.

20. The method of claim 16, wherein each base signal source includes a respective laser diode and a respective intensity modulator that is coupled to the respective laser diode.

* * * * *